(12) United States Patent
Chau

(10) Patent No.: US 11,431,844 B1
(45) Date of Patent: Aug. 30, 2022

(54) HANDLING MULTIPLE COMMUNICATION REQUESTS

(71) Applicant: Zoom Video Communications, Inc., San Jose, CA (US)

(72) Inventor: Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/515,161

(22) Filed: Oct. 29, 2021

(51) Int. Cl.
*H04M 3/436* (2006.01)
*H04M 3/22* (2006.01)

(52) U.S. Cl.
CPC ......... *H04M 3/436* (2013.01); *H04M 3/2227* (2013.01); *H04M 2203/5018* (2013.01)

(58) Field of Classification Search
USPC ....................... 379/241, 207.05, 88.12–88.17
See application file for complete search history.

(56) References Cited

U.S. PATENT DOCUMENTS 8,582,745 B1 * 11/2013 Chitnis .................. H04M 3/42
379/207.05
9,510,166 B1   11/2016 Allen et al.
2020/0066133 A1 * 2/2020 Shekh-Yusef ........... G10L 25/51

OTHER PUBLICATIONS

SIP—Basic Call Flow, https://www.tutorialspoint.com, Oct. 7, 2021, 2 pages.
Quora, What happens if two people call each other at the exact same time? (over the phone), https://www.quora.com, Oct. 6, 2021, 6 pages.

* cited by examiner

*Primary Examiner* — Maria El-Zoobi
(74) *Attorney, Agent, or Firm* — Young Basile Hanlon & MacFarlane, P.C.

(57) ABSTRACT

A communication server detects a first communication request from a first caller device to a second caller device. The communication server detects a second communication request from the second caller device to the first caller device. The first communication request and the second communication request both occur within a threshold time period. The communication server establishes, without additional input from the first caller device and the second caller device, an active session in response to the first communication request. The active session is established between the first caller device and the second caller device. The communication server dismisses the second communication request.

18 Claims, 10 Drawing Sheets

US 11,431,844 B1

HANDLING MULTIPLE COMMUNICATION REQUESTS

FIELD

This disclosure relates to handling multiple communication requests, such as those that may be used with telephony services implemented over a network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
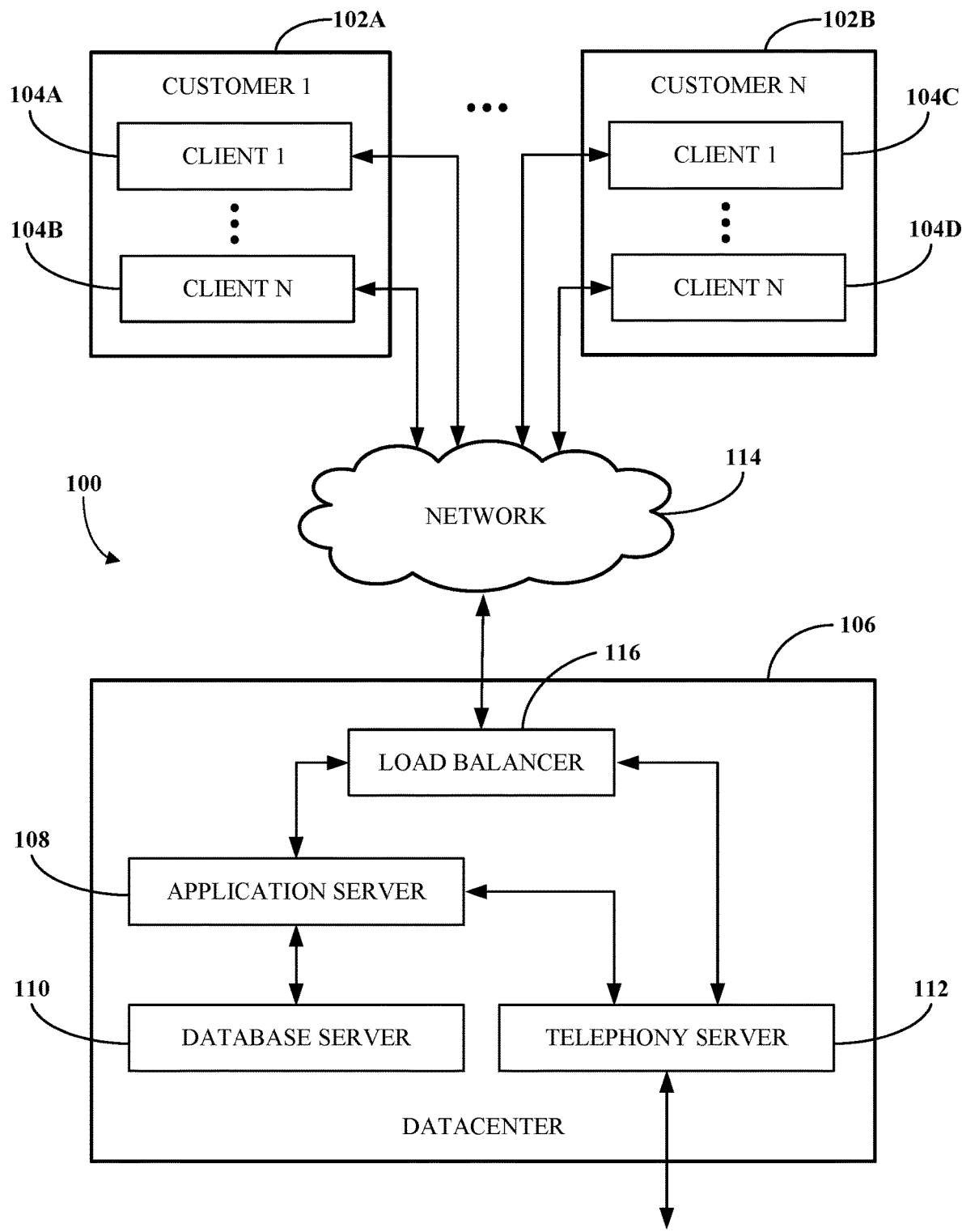
FIG. 1 is a block diagram of an example of an electronic computing and communications system.

Enterprise entities rely upon several modes of communication to support their operations, including telephone, email, and internal messaging. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them.

One type of system which addresses problems such as these includes a unified communications as a service (UCaaS) platform, which includes several communications services integrated over a network, such as the Internet, to deliver a complete communication experience regardless of physical location. Sometimes, two users of a communication service (e.g., a service implemented over a UCaaS platform or another voice, video or other type of communication service) might attempt to communicate with each other over a given communication service at approximately the same time (e.g., within 1 second, 3 seconds, 10 seconds or 30 seconds of each other). For example, two people might simultaneously (e.g., within 5 seconds or 15 seconds of one another) call each other if they did not agree on who would call whom for a scheduled meeting. This might lead to difficulty in connecting the two users, who might experience busy signals, connection errors or other connection issues. For example, those two people may each see that the other is calling them and disconnect from their own calls, further delaying their discussion and requiring additional efforts to establish an actual call session. Techniques for handling multiple communication requests that include the same users (e.g., A calls B and B calls A) and are generated within a threshold time period (e.g., 5 seconds or 15 seconds) of one another may be desirable. As used herein, a "user" may be an entity using a communication service, such as a voice calling, video calling, voice conferencing or video conferencing service. As used herein, a "communication request" may be any request by a user of a caller device to communicate with one or more other users of caller device(s) via the caller device(s). For example, a communication request may be completed by dialing a telephone number, selecting at least one entity from a contact list for initiation of a voice or video call or conference, or entering an entity identifier and selecting a voice call or video call command.

Implementations of this disclosure address problems such as these by handling multiple communication requests that are pending simultaneously and include common users (e.g., identified by telephone number, user account, or device identifier).

In some implementations, a communication server (e.g., which includes one or more proxy server) accesses indicia of a first invite to a first call being transmitted from a first caller device to a second caller device (e.g., a user of the first device dials a telephone number assigned for use to the second device) and a second invite to a second call being transmitted from the second caller device to the first caller device (e.g., a user of the second caller device dials a telephone number assigned for use to the first caller device). The first invite occurred within a threshold time period (e.g., 10 seconds or 30 seconds) of the second invite. In some implementations, the first invite and the second invite are pending (e.g., still attempting to connect and not yet accepted) during overlapping time periods (e.g., the time when the first invite is pending overlaps, at least in part, with the time period when the second invite is pending). In some implementations, the first caller device is identified based on the first caller device having dialed earlier than the second caller device.

The communication server transmits, to the first caller device, a control signal to initiate an active session (e.g., a telephone call, an audio-only conference or a video-enabled conference) in response to the first invite. After establishing the active session, the communication server determines that the second caller device is still attempting to initiate the second call and that the second call is not established. In response, the communication server dismisses the second call and causes the second calling device to join the active session, or merges the second call into the active session. The communication server conducts the active session according to a configuration (e.g., a recording configuration, time-limit configuration, or other policy-based configuration set for the user whose session was determined for use as the active session) associated with the first caller device. The active session is joined by at least the first caller device and the second caller device. In some cases, other device(s) are also involved in the active session, and the second caller device is notified of the presence of the other device(s).

To describe some implementations in greater detail, reference is first made to examples of hardware and software structures used to implement a system for handling multiple communication requests. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
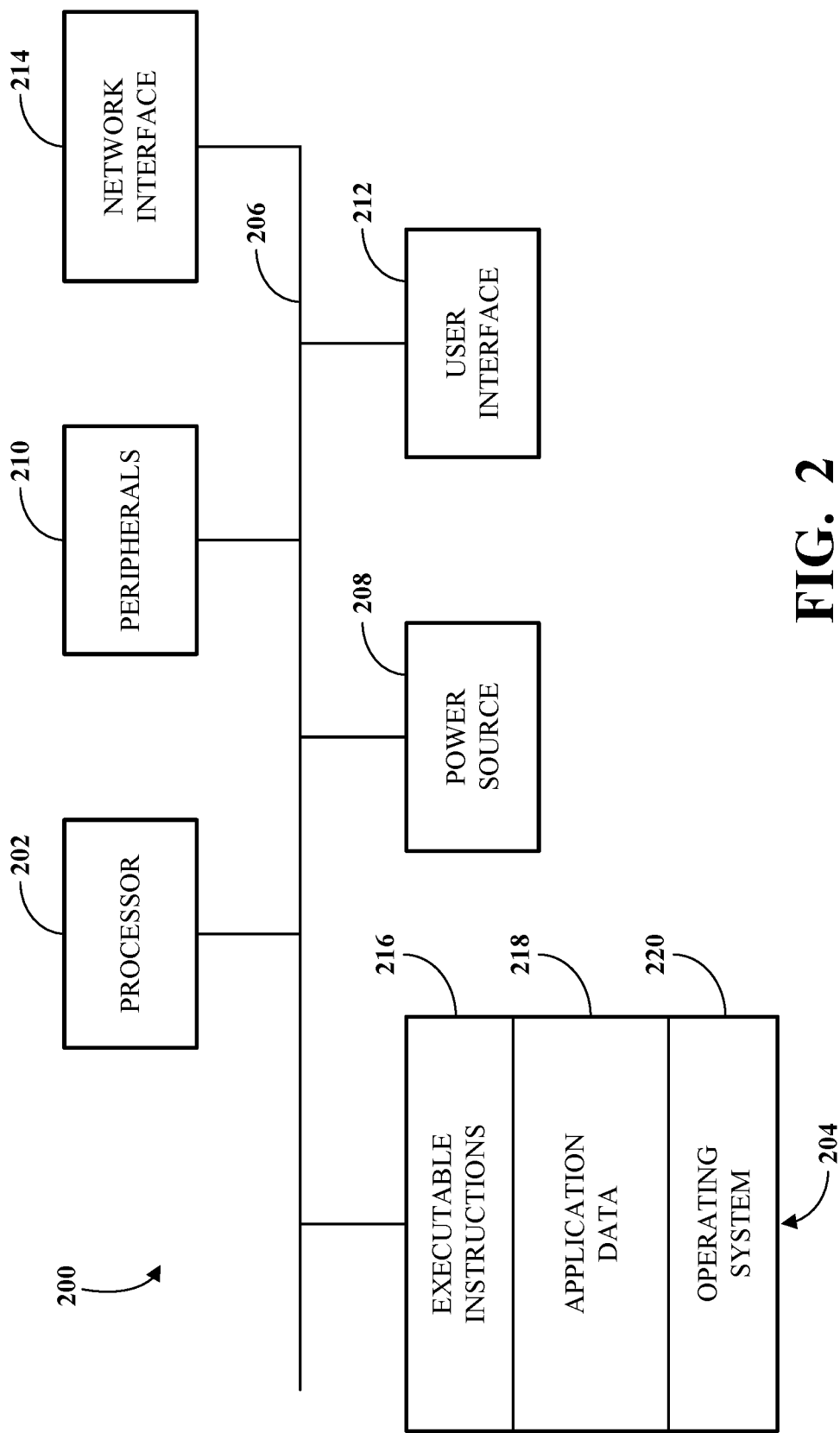
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
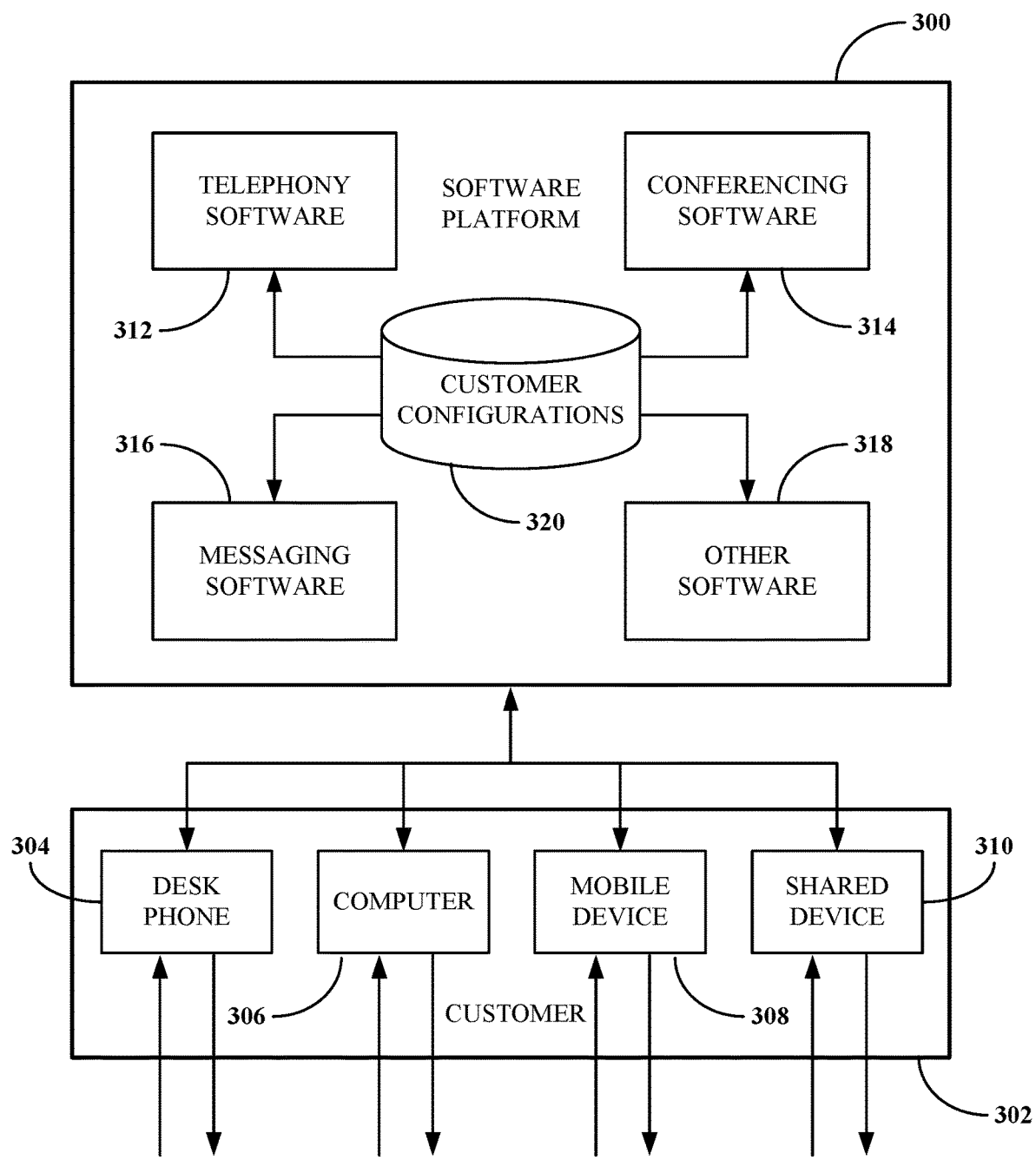
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, and third party integration software. In one particular example, the other software 318 can include a communication request merging engine.

The communication request merging engine, when executed, causes a communication server to detect a first communication request from a first caller device to a second caller device. The communication server detects second communication request from the second caller device to the first caller device. The first communication request and the second communication request both occur within a threshold time period (e.g., 15 seconds or 35 seconds). The communication server establishes, without additional input from the first caller device and the second caller device, an active session in response to the first communication request. The active session is established between the first caller device and the second caller device. The communication server dismisses the second communication request.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
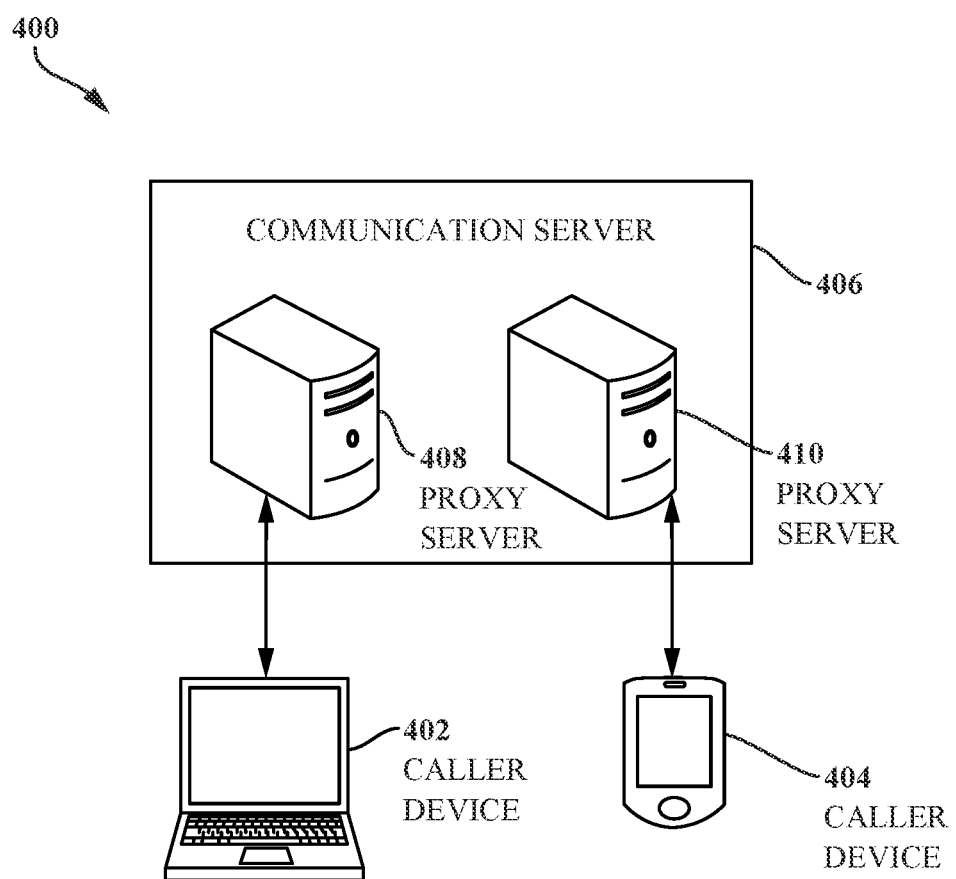
FIG. 4 illustrates an example communication system in which handling multiple communication requests may be implemented.

FIG. 4 illustrates an example communication system 400 in which handling multiple communication requests may be implemented. As shown, the communication system includes caller devices 402 and 404 and a communication server 406. The caller devices 402 and 404 may correspond to clients 104A, 104B, 104C or 104D. The communication server 406 may correspond to the datacenter 106. The communication server 406 includes one or more proxy servers 408 and 410, including a proxy server 408 associated with the caller device 402 and a proxy server 410 associated with the caller device 404. Each of the proxy servers 408 and 410 may correspond to the telephony server 112. The communication server 406 may also, in some cases, include other devices. Each of the caller devices 402 and 404 and the proxy servers 408 and 410 may include all or a portion of the components of the computing device 200. The caller devices 402 and 404 may be connected with the communication server 406 via one or more networks. The one or more networks may include one or more of the Internet, an intranet, a local area network, a wide area network, wired network, a wireless network, a cellular network, a Wi-Fi® network, a VPN, or other networks.

The caller devices 402 and 404 may include any devices capable of processing audio or video calls. For example, each caller device 402 and 404 may include one or more of a mobile phone, a tablet computer, a smartwatch, a laptop computer, a desktop computer, a computing device running a softphone application or a VOIP phone. Each caller device 402 and 404 may be capable of placing, receiving or joining one or more of voice calls, video calls, audio conferences, and video conferences. Each caller device 402 and 404 may be registered with a proxy server 408 and 410, respectively. The proxy server 408 accepts outgoing communication requests from the associated caller device 402 and directs incoming communication requests to the associated caller device 402. Similarly, the proxy server 410 accepts outgoing communication requests from the associated caller device 404 and directs incoming communication requests to the associated caller device 404. The proxy server(s) 408, 410 may be coupled with caller device(s) 402, 404 based on geographic location or connection type (e.g., wired, Wi-Fi® or cellular). While two caller devices 402, 404 and two proxy servers 408, 410 are illustrated, the technology disclosed herein may be implemented with other numbers of caller devices and proxy servers. Furthermore, while FIG. 4 illustrates a one-to-one coupling of proxy servers to caller devices, in some implementations, a single proxy server may be coupled with multiple caller devices.

According to some implementations, the communication server 406 detects a first communication request from the caller device 402 to the caller device 404. The communication server 406 detects a second communication request from the caller device 404 to the caller device 402. The first communication request and the second communication request both occur within a threshold time period (e.g. 40 seconds). For example, both the first communication request and the second communication request may be pending at least partially simultaneously. A communication request may be pending if it is already placed but not yet accepted (e.g., by answering a traditional telephone call), cancelled (e.g., the user who placed the communication request cancels it) or sent to a voice or video mailbox. The communication server establishes, without additional input from the caller device 402 and the caller device 404, an active session in response to the first communication request. The active session is established between the caller device 402 and the caller device 404. The communication server 406 dismisses the second communication request. More details of examples of activity of the communication server 406 are described below in conjunction with FIGS. 5-7.

Some implementations log that both caller devices 402 and 404 attempted to initiate the call. Such logging may be important for compliance reasons (e.g., all calls initiated by a customer service center are to be recorded) or for individual policy reasons (e.g., one of the caller devices 402 or 404 may have settings that automatically record outgoing calls but not incoming calls). Unless there is a conflict between settings, the outgoing call settings of both caller devices 402 and 404 may be applied to the active session.

Figure 5:
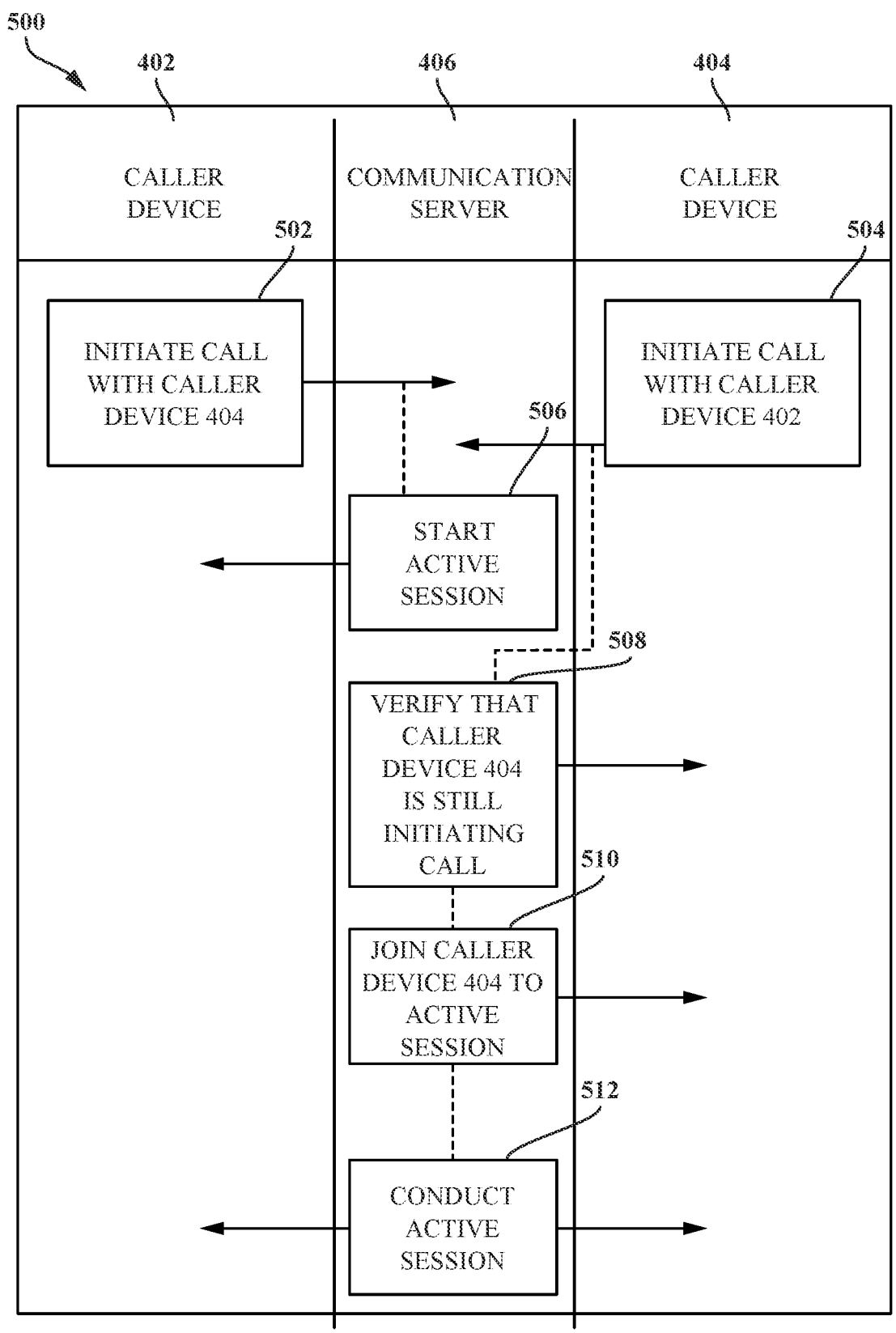
FIG. 5 is a data flow diagram of an example of a sequence of operations for handling multiple communication requests.

FIG. 5 is a data flow diagram of an example of a sequence 500 of operations for handling multiple communication requests. As shown, the sequence 500 is implemented using caller device 402, caller device 404, and communication server 406.

At block 502, the caller device 402 initiates a first call with the caller device 404. The initiation of the first call is communicated to communication server 406. For example, a user of the caller device 402 may dial a telephone number associated with caller device 404 or place a request to communicate with an account identifier associated with caller device 404 in an audio or video communication application.

At block 504, the caller device 404 initiates a second call with the caller device 402, for example, using similar techniques to those described in conjunction with block 502. The initiation of the second call is communicated to communication server 406. In some implementations, the initiation of the first call (of block 502) is detected, at the communication server 406, before the initiation of the second call (of block 504). The caller device 404 may initiate the second call with the caller device 402 using a different technique than the caller device 402 uses to initiate the first call (for example, the caller device 402 may initiate the first call using a telephone number that is coordinated via the PSTN while the caller device 404 may initiate the second call using an email address).

At block 506, the communication server 406 starts an active session in response to the initiation of the first call. The communication server 406 notifies the caller device 402 that the active session is starting and joins the caller device 402 to the active session. The active session is configured based on a configuration (e.g., recording configuration, time limit configuration, audio and video accessibility configuration) associated with the caller device 402. A recording configuration may include automatically recording an active session to the local memory of a caller device or to a network-based memory location. A time limit configuration may include a configuration that terminates an active session a predetermined amount of time (e.g., 30 minutes or 45 minutes) after the active session begins. An audio and video accessibility configuration may include whether participant(s) in the active session are permitted to transmit audio or video (e.g., whether each participant's camera or microphone is turned on or off).

At block 508, the communication server 406 verifies that the caller device 404 is still initiating the second call. For example, the second call might not have been answered yet (by the caller device 402), and the caller device 404 might not have cancelled the call initiation request.

At block 510, in response to verifying that the caller device 404 is still initiating the second call, the communication server 406 joins the caller device 404 to the active session. The caller device 404 may be joined to the active session without additional input from either the caller device 402 or the caller device 404. For example, the user of the caller device 404 might not have to affirmatively answer the call from the caller device 402 in order to be joined into the active session. In some cases, if additional device(s) (in addition to the caller device 402 and the caller device 404) are present in the active session, the communication server 406 notifies the caller device 404 of the presence of the additional device(s) in the active session.

At block 512, the communication server 406 conducts the active session. The active session includes at least the caller device 402 and the caller device 404.

Some implementations may be performed in conjunction with an audio or video calling application, where the caller devices 402, 404 have the audio or video calling application installed thereon, and the communication server 406 is associated with the audio or video calling application. Some embodiments may be implemented using a telephone network, where the communication server 406 is a server associated with a telephone network and the caller devices 402, 404 are telephones or computing devices having an assigned telephone number or telephone calling application running thereon.

Some implementations relate to SIP. Some implementations include adapting SIP for a situation when two caller devices call each other within a threshold time period of one another.

Figure 6:
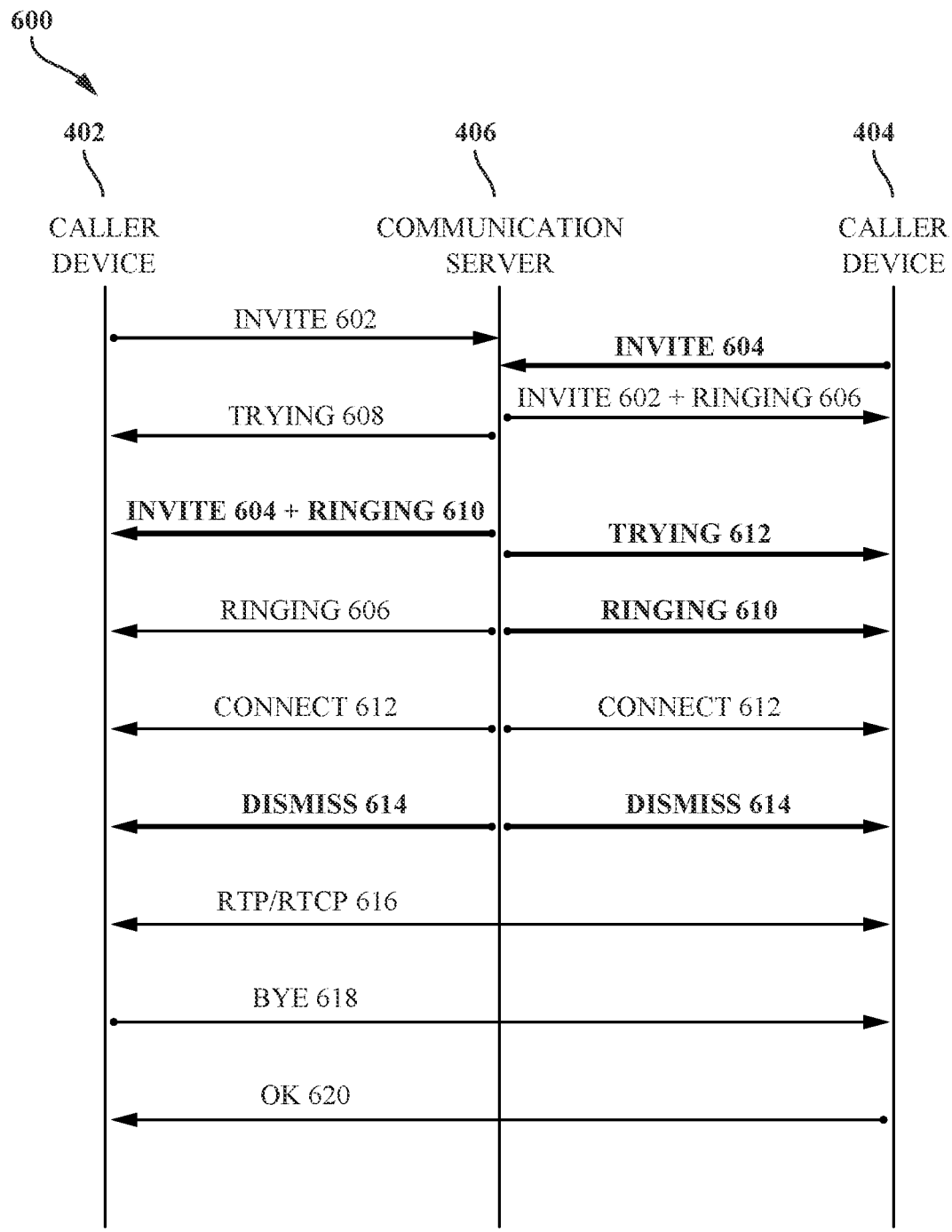
FIG. 6 is a data flow diagram of an example sequence of operations for modification of Session Initiation Protocol (SIP) for handling multiple communication requests.

FIG. 6 is a data flow diagram of an example sequence 600 of operations for modification of SIP for handling multiple communication requests. As shown, the sequence 600 uses the caller device 402, the caller device 404, and the communication server 406.

As shown, the caller device 402 sends an invite 602 (for a first call with the caller device 404) to the communication server 406. Within a threshold time (e.g., 5 seconds or 30 seconds), the caller device 404 sends an invite 604 (for a second call with the caller device 402) to the communication server 406.

In response to the invite 602, the communication server 406 forwards the invite 602 and a ringing 606 command to the caller device 404. The communication server 406 sends a trying 608 message to the caller device 402 so the caller device 402 stops retransmission of the invite 602.

Similarly, in response to the invite 604, the communication server 406 forwards the invite 604 and a ringing 610 command to the caller device 402. The communication server 406 sends a trying 612 message to the caller device 404 so the caller device 404 stops retransmission of the invite 604.

The communication server 406 notifies caller device 402 of ringing 606 at the caller device 404 at approximately the same time (e.g., within 10 seconds or 20 seconds) as notifying the caller device 404 of ringing 610 at the caller device 402.

To prevent confusion (e.g., by people) from ensuing when the two call initiations are accepted in parallel, the communication server 406 automatically (e.g., without additional input from the caller device 402 or the caller device 404) connects 612 the call based on the invite 602 and dismisses 614 the call based on the invite 604. The communication server 406 transmits, to the caller device 402 and the caller device 404, the connect 612 signal and the dismiss 614 signal.

The call based on the invite 602 then proceeds. Caller device 402 and caller device 404 communicate using Real-time Transport Protocol (RTP) or RTP Control Protocol (RTCP) 616 until one of the caller device 402 or the caller device 404 decides to end the call. As shown, the caller device 402 sends a bye 618 signal ending the call. In response, the caller device 404 sends an ok 620 signal acknowledging the end of the call. In alternative implementations, the caller device 404 could send the bye signal and the caller device 402 could send the ok signal.

Some implementations relate to determining, from among two (or more) caller devices that call each other within a threshold time period, which caller device will be the first caller device 402 and which caller device will be the second caller device 404. The first caller device 402 may be said to have ownership of the active session. In some implementations, ownership of the active session is assigned to the first caller device 402 and configuration settings of the active session are set based on settings of an account associated with the first caller device 402. The configuration settings may include, for example, recording settings or time-limit settings.

In some implementations, the first caller device 402 is identified, by the communication server 406, based on the invite 602 from the first caller device 402 reaching the communication server 406 before the invite 604 from the second caller device 404.

In some implementations, the first communication request from the first caller device 402 (which is to receive ownership of the active session) is identified, from a set comprising the first communication request from the first caller device 402 and the second communication request from the second caller device 404, based on at least one of a set of factors. The set of factors may include a timing of communication requests in the set. The set of factors may include a status (e.g., very important person (VIP), regulatory) associated with devices initiating the communication requests in the set, with the highest status person on the call getting ownership of the call. The status may be useful for customer service needs of the telephony service provider. Regulatory teams may have complex recording and storage settings associated with their calls for legal reasons, and it is good customer service for the telephony service provider to keep VIPs (e.g., president or chief executive of a company) pleased by enforcing their call settings whenever it may be desirable to the VIPs. The set of factors may include a signal quality associated with the devices initiating the communication requests in the set. For example, if one device has a strong network signal and another device has a weak network signal, the device with the strong signal may be assigned ownership of the communication request. The set of factors may include a complexity of settings (e.g., if one device uses default settings and another device has unique time limit, recording, and audio volume limit settings, the settings of the other device may be used, as the user of the other device is likely to have carefully created his/her settings and to value the settings) associated with the devices initiating the communication requests in the set. The set of factors may include an indication that a user of one of the devices initiating the communication requests in the set created a calendar event associated with the active session. For example, the caller who created the calendar invite for the active session may be assigned ownership of the active session. Information identifying the caller who created the calendar invite may, for example, be or include metadata associated with a calendar of one or both of the callers using the first caller device 402 and the second caller device 404. The set of factors may include a device type of the devices initiating the communication requests in the set. For example, if a user of a desktop computer is initiating an active session with a user of a mobile phone using the techniques described herein, the setting associated with the user of the desktop computer may be used.

FIGS. 4-6 illustrate two caller devices 402, 404 attempting to connect to one another by placing calls to one another within a threshold time period of each other. However, in some implementations, more than two caller devices (e.g., three caller devices, four caller devices, five caller devices, or more) may attempt to connect to one another within a threshold time period of each other.

Figure 7:
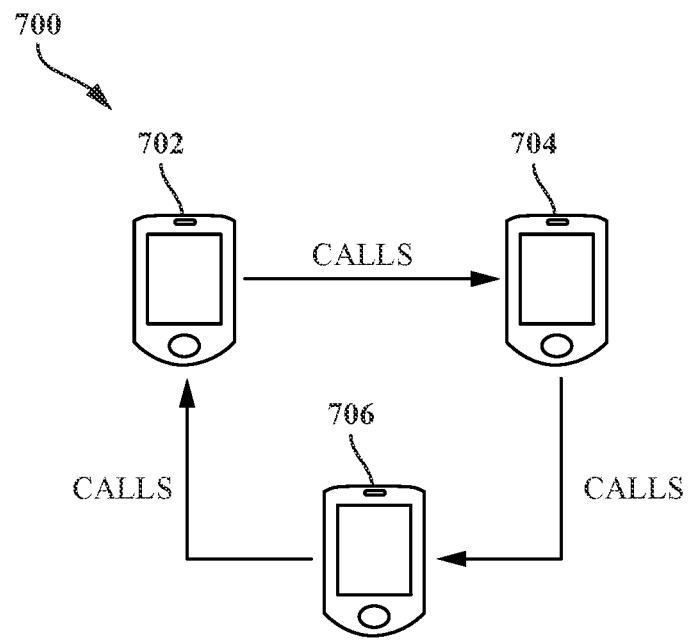
FIG. 7 illustrates a first example system with three caller devices calling one another within a threshold time period.

FIG. 7 illustrates a first example system 700 with three caller devices calling one another within a threshold time period. As shown in FIG. 7, caller device 702 calls caller device 704, caller device 704 calls caller device 706, and caller device 706 calls caller device 702, all within a threshold time period of each other. In response, a three-way active session between caller devices 702, 704, 706 may be created, and one of the caller devices 702, 704, 706 may be assigned ownership of the active session using the techniques described above. All of the caller devices 702, 704, and 706 may be informed of the other caller devices present on the call to protect privacy and avoid surprises. For example, when caller device 702 calls caller device 704, the user of caller device 702 might not expect the user of caller device 706 to be present on the call (at least until the caller device 706 is added to the call).

Figure 8:
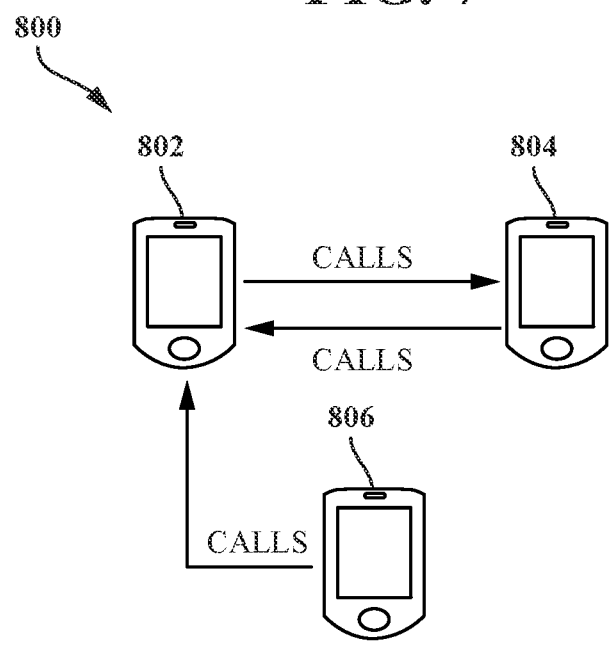
FIG. 8 illustrates a second example system with three caller devices calling one another within a threshold time period.

FIG. 8 illustrates a second example system 800 with three caller devices calling one another within a threshold time period. As shown in FIG. 8, caller device 802 calls caller device 804, caller device 804 calls caller device 802, and caller device 806 calls caller device 802, all within a threshold time period of each other. In response, in some examples, a three-way active session may be set up between caller devices 802, 804, and 806, as described in conjunction with FIG. 7. This might be desirable, for example, if there are other indicia (e.g., text messages, email messages or a calendar invite) that the users of the caller devices 802, 804, and 806 wanted to communicate with one another in a three-way active session.

However, in some situations, the users of the caller devices 802 and 804 want to communicate with one another without the user of the caller device 806. For example, the users of the caller devices 802 and 804 may be coworkers working on a project together, while the user of the caller device 806 might be a telemarketer or a personal friend of the user of the caller device 802, who should not be present during the call between caller devices 802 and 804. Thus, if indicia that the users of the caller devices 802, 804, and 806 wanted to communicate with one another in a three-way active session are not present, a two-way active session may be created between the caller devices 802 and 804 may be created using the techniques described herein. The caller device 802 might also be informed of the incoming call from caller device 806 (and, upon acceptance of the call from caller device 806, could have the option to merge the calls between caller devices 802, 804 and caller devices 802, 806) using call waiting functionality. Alternatively, the caller device 806 might be informed that the caller device 802 is unavailable or provided the option to leave a message in a voice mailbox associated with the caller device 802.

Figure 9:
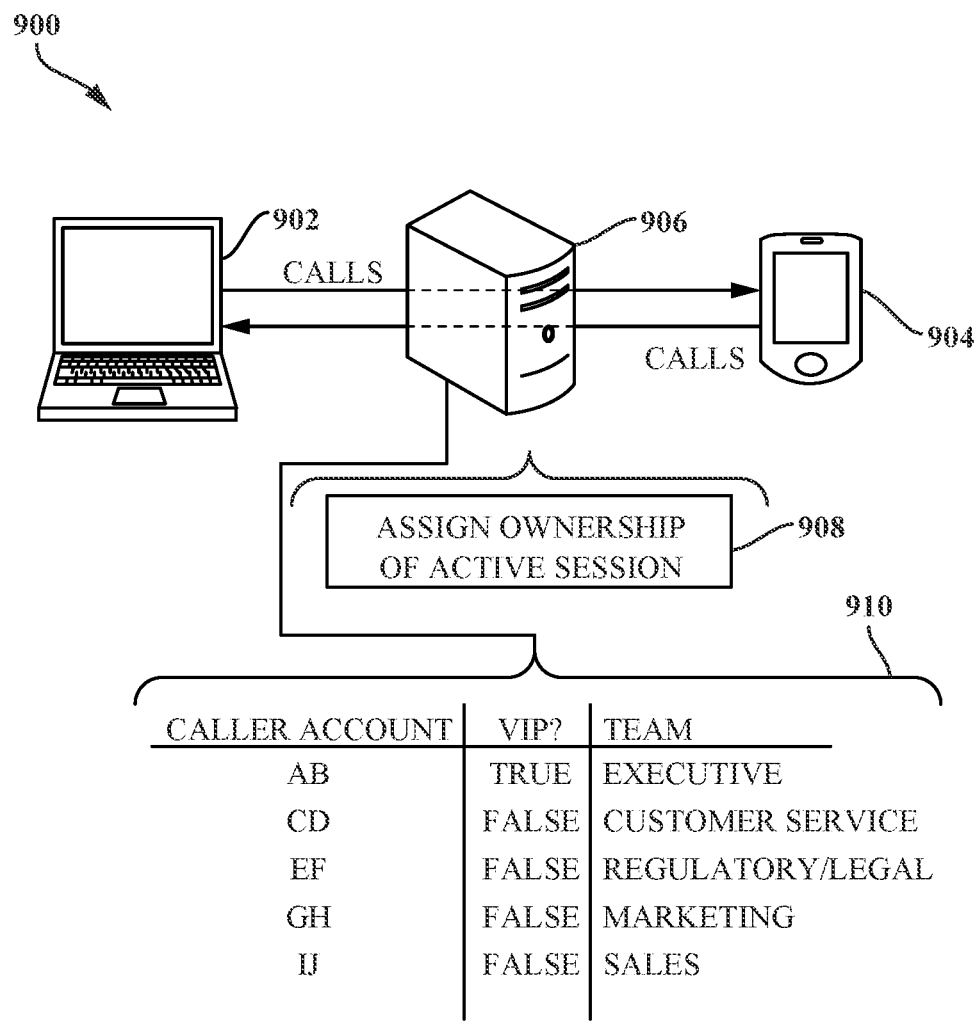
FIG. 9 illustrates an example system in which call merging and ownership assignment may be implemented.

FIG. 9 illustrates an example system 900 in which call merging and ownership assignment may be implemented. As shown, the system 900 includes caller devices 902 and 904 and a communication server 906. As illustrated in FIG. 9, caller device 902 and caller device 904 call each other, via the communication server 906, within a threshold time period of one another. At block 908, the communication server 906 assigns ownership of the active session between caller devices 902 and 904. As shown, the communication server 906 stores a data structure 910 that is used to assign ownership of the active session. The data structure 910 stores a set of caller accounts. For each caller account, the data structure 910 stores a Boolean VIP status and an indication of a team associated with the caller account. (In alternative implementations, the VIP status might have a value other than Boolean, for example, a number indicating rank or a military (or other) rank such as "Sergeant," "Corporal," "Private," and other military ranks.) The ownership of the active session, at block 908, may be assigned based on data of the caller accounts (e.g., VIP status or team membership) stored in the data structure 910 that is associated with the caller accounts of the caller devices 902 and 904.

Figure 10:
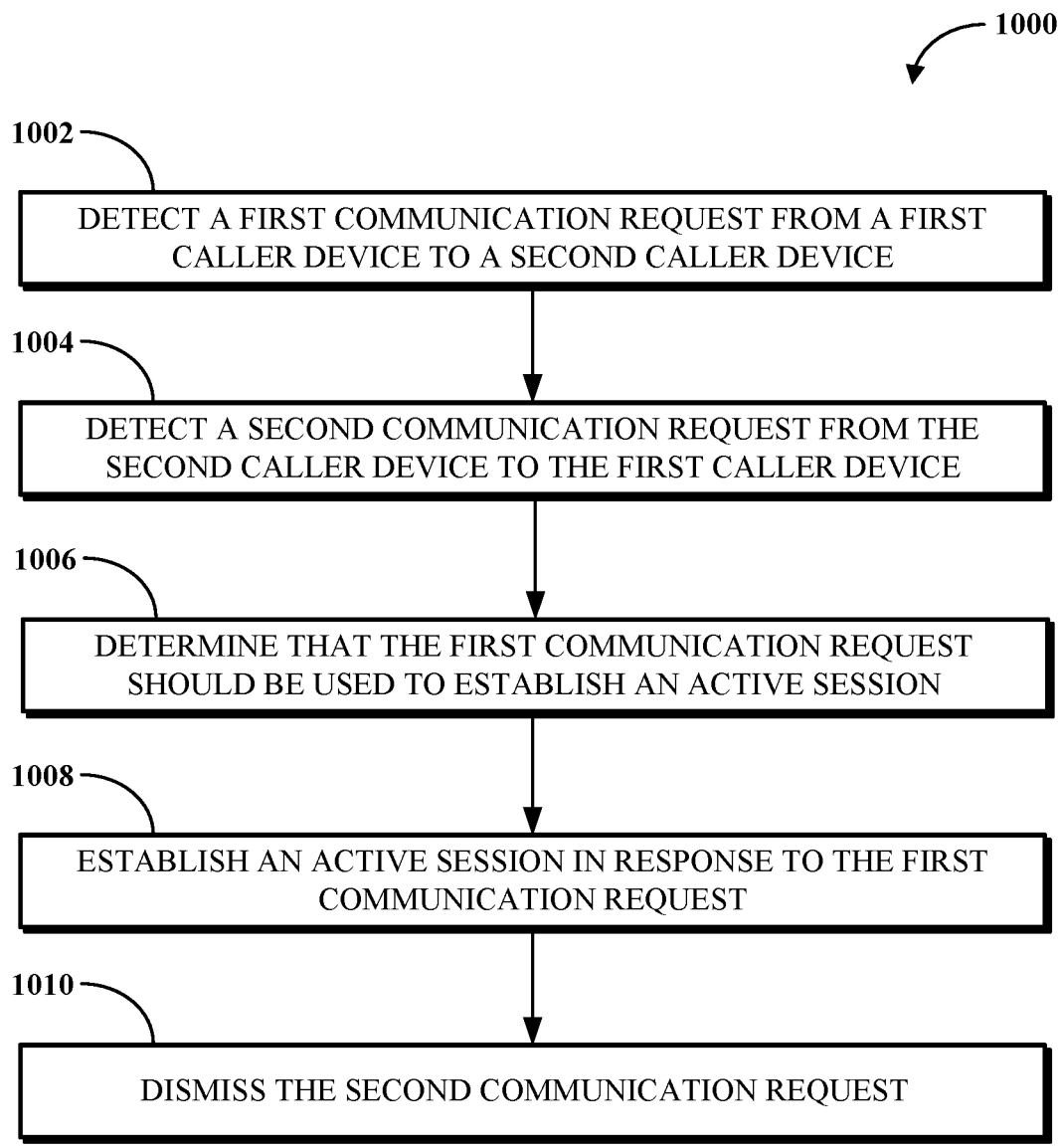
FIG. 10 is a flowchart of an example of a technique for handling multiple communication requests.

To further describe some implementations in greater detail, reference is next made to examples of techniques which may be performed by or using a communication server (e.g., communication server 406) in handling multiple communication requests. FIG. 10 is a flowchart of an example of a technique 1000 for handling multiple communication requests. The technique 1000 can be executed using computing devices, such as the systems, hardware, and software described with respect to FIGS. 1-9. The technique 900 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At block 1002, a communication server (e.g., communication server 406) detects a first communication request from a first caller device (e.g., caller device 402) to a second caller device (e.g., caller device 404). For example, the first caller device may dial a telephone number associated with the second caller device. Alternatively, a user of the first caller device may enter a voice or video communication request to the second caller device via a contact list at the first caller device.

At block 1004, the communication server detects a second communication request from the second caller device to the first caller device. The first communication request and the second communication request both occur within a threshold time period. For example, the second caller device may dial a telephone number associated with the first caller device. Alternatively, a user of the second caller device may enter a voice or video communication request to the first caller device via a contact list at the second caller device.

At block 1006, the communication server determines that the first communication request, rather than the second communication request, should be used to establish the active session between the first caller device and the second caller device. This determination may be made based on an initiation time of the first communication request preceding an initiation time of the second communication request. This determination may be made based on at least one of: a timing of communication requests in a set including the first communication request and the second communication request, a status associated with devices initiating the communication requests in the set, a signal quality associated with the devices initiating the communication requests in the set, a complexity of settings associated with the devices initiating the communication requests in the set, an indication that a user of one of the devices initiating the communication requests in the set created a calendar event associated with the active session, or a device type of the devices initiating the communication requests in the set.

At block 1008, the communication server establishes the active session in response to the first communication request. The active session is established between the first caller device and the second caller device. The active session is established without additional input from the first caller device and the second caller device. The active session may include a voice call, a video call, an audio conference or a video conference.

At block 1010, the communication server dismisses the second communication request. For example, the communication server sends a "dismiss" message to the second caller device in response to the second communication request. In response to the "dismiss" message, the second caller device might stop attempting to initiate an active session in response to the second caller request. According to some implementations, the communication server dismisses the second communication request in response to determining, at the communication server, that the second communication request is still pending.

According to some implementations, the communication server includes one or more proxy servers (e.g., proxy server 408 and proxy server 410).

According to some implementations, the active session is configured according to configuration setting associated with the first caller device. The configuration includes recording settings or time-limit settings.

According to some implementations, the communication server determines, upon the second caller device joining the active session, that at least one third caller device is present in the active session. The communication server transmits, to the second caller device, a notification indicating the presence of the third caller device(s).

According to some implementations, the first communication request is detected, by the communication server, before the second communication request.

According to some implementations, to establish the active session, the communication server notifies the first caller device of acceptance of the first communication request. The communication server merges the second communication request into the active session.

Figure 11:
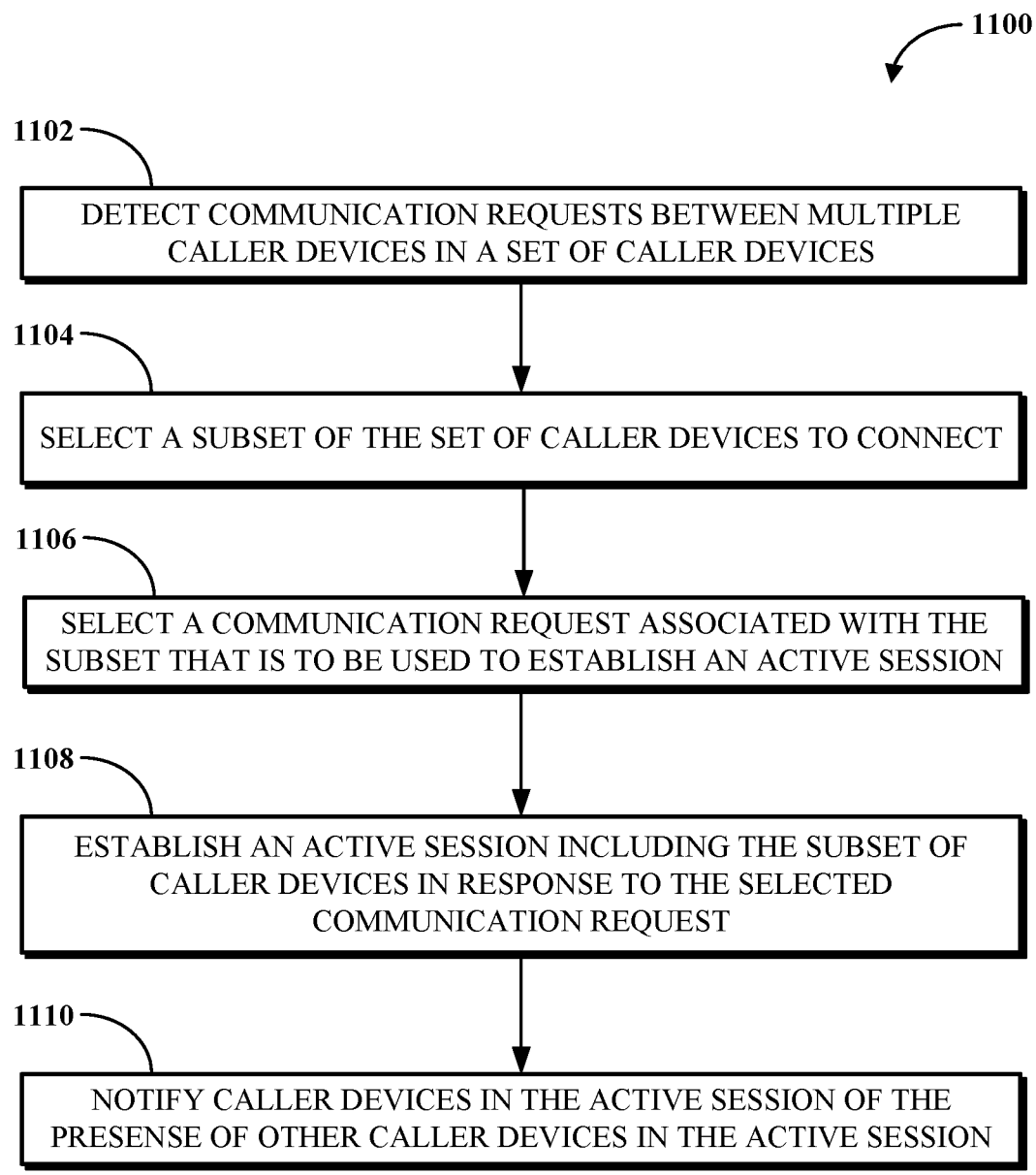
FIG. 11 is a flowchart of an example of a technique for handling multiple communication requests with three or more parties.

FIG. 11 is a flowchart of an example of a technique 1100 for handling multiple communication requests with three or more parties. The technique 1000 can be executed using computing devices, such as the systems, hardware, and software described with respect to FIGS. 1-9. The technique 1100 can be performed, for example, by executing a machine-readable program or other computer-executable instructions, such as routines, instructions, programs, or other code. The steps, or operations, of the technique 1100 or another technique, method, process, or algorithm described in connection with the implementations disclosed herein can be implemented directly in hardware, firmware, software executed by hardware, circuitry, or a combination thereof.

For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At block 1102, a communication server detects communication requests between multiple caller devices in a set of caller devices, for example, as shown in FIGS. 7-8. As shown in FIG. 7, caller device 702 calls caller device 704, caller device 704 calls caller device 706, and caller device 706 call caller device 702. As shown in FIG. 8, caller device 802 calls caller device 804, caller device 804 calls caller device 802, and caller device 806 calls caller device 802. In some embodiments, two or more of the caller devices in the set might already be communicating with one another when the communication requests are received. For example, Device A might call into a conference call including Device B and Device C, while Device C calls Device A to add Device A into the conference call.

At block 1104, the communication server selects a subset of the set of caller devices to connect. The subset may include all or a portion of the caller devices in the set. For example, as shown in FIG. 7, each and every one of the devices in the set of caller devices 702, 704, and 706 may be connected. As shown in FIG. 8, caller devices 802 and 804 may be connected. However, caller device 806 might not be connected unless one of the caller devices 802 and 804 attempts to add caller device 806 to the active session between caller devices 802 and 804.

At block 1106, the communication server selects a communication request associated with the subset that is to be used to establish an active session. The communication request that is selected may be the one that was initiated earliest-in-time. The communication request may be selected based on at least one of: a timing of communication requests, a status associated with devices initiating the communication requests, a signal quality associated with the devices initiating the communication requests, a complexity of settings associated with the devices initiating the communication requests, an indication that a user of one of the devices initiating the communication requests in the set created a calendar event associated with the active session, or a device type of the devices initiating the communication requests in the set.

At block 1108, the communication server establishes an active session including the subset of caller devices in response to the selected communication request. The settings of the selected communication request are used as the setting for the active session. For example, recording settings (e.g., whether the active session is recorded to a network-based storage unit or a local memory of a caller device in the active session), time limit settings (e.g., whether the call is automatically terminated after a predetermined time period), and the like may be used.

At block 1110, the communication server notifies caller devices in the active session of the presence of other caller devices in the active session. This prevents users of the caller devices from being surprised that devices that they did not call are present in the active session. The notification may be provided in audio form or in a visual display. For example, the communication server may play an audio into the active session stating an identifier (e.g., a telephone number, an email address or a user identifier) of all or a portion of the devices present in the active session.

Some implementations are described below as numbered examples (Example 1, 2, 3, etc.). These examples are provided as exampled only and do not limit the disclosed technology.

Example 1 is a method comprising: detecting a first communication request from a first caller device to a second caller device; detecting a second communication request from the second caller device to the first caller device, wherein the first communication request and the second communication request both occur within a threshold time period; establishing, without additional input from the first caller device and the second caller device, an active session in response to the first communication request, wherein the active session is established between the first caller device and the second caller device; and dismissing the second communication request.

In Example 2, the subject matter of Example 1 includes, wherein the first communication request and the second communication request are detected at a communication server comprising one or more proxy servers.

In Example 3, the subject matter of Examples 1-2 includes, wherein the active session is configured according to a configuration setting associated with the first caller device, and wherein the configuration setting comprises recording settings or time-limit settings.

In Example 4, the subject matter of Examples 1-3 includes, wherein the active session comprises at least one of a voice call, a video call, an audio conference or a video conference.

In Example 5, the subject matter of Examples 1-4 includes, determining, based on the second caller device joining the active session, that a third caller device is present in the active session; and transmitting, to the second caller device, a notification indicating the presence of the third caller device.

In Example 6, the subject matter of Examples 1-5 includes, wherein the first communication request is detected before the second communication request.

In Example 7, the subject matter of Examples 1-6 includes, wherein the first communication request is identified, from a set of communication requests comprising the first communication request and the second communication request, based on at least one of: a timing of communication requests in the set, a status associated with each device initiating the communication requests in the set, a signal quality associated with the devices initiating the communication requests in the set, a complexity of settings associated with the devices initiating the communication requests in the set, an indication that a user of one of the devices initiating the communication requests in the set created a calendar event associated with the active session, or a device type of the devices initiating the communication requests in the set.

In Example 8, the subject matter of Examples 1-7 includes, wherein the active session is established by: notifying, by the communication server, the first caller device of acceptance of the first communication request; and merging, by the communication server, the second communication request into the active session.

In Example 9, the subject matter of Examples 1-8 includes, wherein the second communication request is dismissed in response to determining, at the communication server, that the second communication request is still attempting to connect.

In Example 10, the subject matter of Examples 1-9 includes, logging that the first caller device and the second caller device attempted to initiate the active session; and applying configuration settings associated with both the first caller device and the second caller device to the active session.

Example 11 is an apparatus comprising: a memory; and a processor configured to execute instructions stored in the memory to: detect a first communication request from a first caller device to a second caller device; detect a second communication request from the second caller device to the first caller device, wherein the first communication request and the second communication request both occur within a threshold time period; establish, without additional input from the first caller device and the second caller device, an active session in response to the first communication request, wherein the active session is established between the first caller device and the second caller device; and dismiss the second communication request.

In Example 12, the subject matter of Example 11 includes, wherein the active session is configured according to a configuration setting associated with the first caller device, and wherein the configuration setting comprises recording settings or time-limit settings.

In Example 13, the subject matter of Examples 11-12 includes, wherein the active session comprises at least one of a voice call, a video call, an audio conference or a video conference.

In Example 14, the subject matter of Examples 11-13 includes, wherein the processor is further configured to execute instructions stored in the memory to: determine, based on the second caller device joining the active session, that a third caller device is present in the active session; and transmit, to the second caller device, a notification indicating the presence of the third caller device.

In Example 15, the subject matter of Examples 11-14 includes, wherein the first communication request is detected before the second communication request.

In Example 16, the subject matter of Examples 11-15 includes, wherein the first communication request is identified, from a set of communication requests comprising the first communication request and the second communication request, based on at least one of: a timing of communication requests in the set, a status associated with each device initiating the communication requests in the set, a signal quality associated with the devices initiating the communication requests in the set, a complexity of settings associated with the devices initiating the communication requests in the set, an indication that a user of one of the devices initiating the communication requests in the set created a calendar event associated with the active session, or a device type of the devices initiating the communication requests in the set.

In Example 17, the subject matter of Examples 11-16 includes, wherein the active session is established by: notifying, by the communication server, the first caller device of acceptance of the first communication request; and merging, by the communication server, the second communication request into the active session.

Example 18 is a computer-readable medium storing instructions operable to cause one or more processors to perform operations comprising: detecting a first communication request from a first caller device to a second caller device; detecting a second communication request from the second caller device to the first caller device, wherein the first communication request and the second communication request both occur within a threshold time period; establishing, without additional input from the first caller device and the second caller device, an active session in response to the first communication request, wherein the active session is established between the first caller device and the second caller device; and dismiss the second communication request.

In Example 19, the subject matter of Example 18 includes, wherein the first communication request and the second communication request are detected at a communication server comprising one or more proxy servers.

In Example 20, the subject matter of Examples 18-19 includes, wherein the active session is configured according to a configuration setting associated with the first caller device, and wherein the configuration setting comprises recording settings or time-limit settings.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, and look-up tables), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, and data processing. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    detecting a first communication request from a first caller device to a second caller device;
    detecting a second communication request from the second caller device to the first caller device, wherein the first communication request and the second communication request both occur within a threshold time period;
    establishing, without additional input from the first caller device and the second caller device, an active session in response to the first communication request, wherein the active session is established between the first caller device and the second caller device;
    dismissing the second communication request;
    determining, based on the second caller device joining the active session, that a third caller device is present in the active session; and
    transmitting, to the second caller device, a notification indicating the presence of the third caller device.

2. The method of claim 1, wherein the first communication request and the second communication request are detected at a communication server comprising one or more proxy servers.

3. The method of claim 1, wherein the active session is configured according to a configuration setting associated with the first caller device, and wherein the configuration setting comprises recording settings or time-limit settings.

4. The method of claim 1, wherein the active session comprises at least one of a voice call, a video call, an audio conference or a video conference.

5. The method of claim 1, wherein the first communication request is detected before the second communication request.

6. The method of claim 1, wherein the first communication request is identified, from a set of communication requests comprising the first communication request and the second communication request, based on at least one of:
    a timing of communication requests in the set,
    a status associated with each device initiating the communication requests in the set,
    a signal quality associated with the devices initiating the communication requests in the set,
    a complexity of settings associated with the devices initiating the communication requests in the set,
    an indication that a user of one of the devices initiating the communication requests in the set created a calendar event associated with the active session, or
    a device type of the devices initiating the communication requests in the set.

7. The method of claim 1, wherein the active session is established by:
    notifying, by the communication server, the first caller device of acceptance of the first communication request; and merging, by the communication server, the second communication request into the active session.

8. The method of claim 1, wherein the second communication request is dismissed in response to determining, at the communication server, that the second communication request is still attempting to connect.

9. The method of claim 1, further comprising:
logging that the first caller device and the second caller device attempted to initiate the active session; and
applying configuration settings associated with both the first caller device and the second caller device to the active session.

10. An apparatus comprising:
a memory; and
a processor configured to execute instructions stored in the memory to:
  detect a first communication request from a first caller device to a second caller device;
  detect a second communication request from the second caller device to the first caller device, wherein the first communication request and the second communication request both occur within a threshold time period;
  establish, without additional input from the first caller device and the second caller device, an active session in response to the first communication request, wherein the active session is established between the first caller device and the second caller device;
  dismiss the second communication request;
  determine, based on the second caller device joining the active session, that a third caller device is present in the active session; and
  transmit, to the second caller device, a notification indicating the presence of the third caller device.

11. The apparatus of claim 10, wherein the active session is configured according to a configuration setting associated with the first caller device, and wherein the configuration setting comprises recording settings or time-limit settings.

12. The apparatus of claim 10, wherein the active session comprises at least one of a voice call, a video call, an audio conference or a video conference.

13. The apparatus of claim 10, wherein the first communication request is detected before the second communication request.

14. The apparatus of claim 10, wherein the first communication request is identified, from a set of communication requests comprising the first communication request and the second communication request, based on at least one of:

a timing of communication requests in the set,
a status associated with each device initiating the communication requests in the set,
a signal quality associated with the devices initiating the communication requests in the set,
a complexity of settings associated with the devices initiating the communication requests in the set,
an indication that a user of one of the devices initiating the communication requests in the set created a calendar event associated with the active session, or
a device type of the devices initiating the communication requests in the set.

15. The apparatus of claim 10, wherein the active session is established by:
notifying, by the communication server, the first caller device of acceptance of the first communication request; and
merging, by the communication server, the second communication request into the active session.

16. A non-transitory computer-readable medium storing instructions operable to cause one or more processors to perform operations comprising:
detecting a first communication request from a first caller device to a second caller device;
detecting a second communication request from the second caller device to the first caller device, wherein the first communication request and the second communication request both occur within a threshold time period;
establishing, without additional input from the first caller device and the second caller device, an active session in response to the first communication request, wherein the active session is established between the first caller device and the second caller device;
dismissing the second communication request;
determining, based on the second caller device joining the active session, that a third caller device is present in the active session; and
transmitting, to the second caller device, a notification indicating the presence of the third caller device.

17. The computer-readable medium of claim 16, wherein the first communication request and the second communication request are detected at a communication server comprising one or more proxy servers.

18. The computer-readable medium of claim 16, wherein the active session is configured according to a configuration setting associated with the first caller device, and wherein the configuration setting comprises recording settings or time-limit settings.

* * * * *